(12) United States Patent
Neyrinck et al.

(10) Patent No.: US 9,463,722 B2
(45) Date of Patent: Oct. 11, 2016

(54) ADJUSTMENT DEVICE FOR MOTOR VEHICLE SEATS

(71) Applicant: Faurecia Autositze GmbH, Stadthagen (DE)

(72) Inventors: Christian Neyrinck, Stadthagen (DE); Andreas Reinecke, Seelze (DE)

(73) Assignee: Faurecia Autositze GmbH (DE)

( * ) Notice: Subject to any disclaimer, the term of this patent is extended or adjusted under 35 U.S.C. 154(b) by 0 days.

(21) Appl. No.: 14/425,924

(22) PCT Filed: Jul. 23, 2013

(86) PCT No.: PCT/EP2013/002179
§ 371 (c)(1),
(2) Date: Mar. 4, 2015

(87) PCT Pub. No.: WO2014/037071
PCT Pub. Date: Mar. 13, 2014

(65) Prior Publication Data
US 2015/0203003 A1    Jul. 23, 2015

(30) Foreign Application Priority Data

Sep. 8, 2012 (DE) ........................ 10 2012 017 823

(51) Int. Cl.
*B60N 2/44* (2006.01)
*B60N 2/42* (2006.01)
*B60N 2/427* (2006.01)

(52) U.S. Cl.
CPC ........... *B60N 2/4415* (2013.01); *B60N 2/4235* (2013.01); *B60N 2/42727* (2013.01); *B60N 2/449* (2013.01); *B60N 2/4492* (2015.04)

(58) Field of Classification Search
CPC .. B60N 2/4415; B60N 2/449; B60N 2/4492; B60N 2/4235; B60N 2/42727
USPC .......................................... 297/284.9, 452.41
See application file for complete search history.

(56) References Cited

U.S. PATENT DOCUMENTS

| | | | |
|---|---|---|---|
| 7,726,739 B2 * | 6/2010 | Wain ...................... | B60N 2/449 297/284.9 |
| 8,844,966 B2 * | 9/2014 | Feller ................... | B60R 21/207 297/284.9 |

FOREIGN PATENT DOCUMENTS

| | | | |
|---|---|---|---|
| DE | 202008006781 | 7/2008 | |
| DE | 102007054257 | 5/2009 | |
| DE | 102008028353 | 12/2009 | |
| DE | 102008063150 | 6/2010 | |
| EP | 0343025 A1 * | 11/1989 | ........... B60N 2/4415 |
| WO | WO 2012139756 | 10/2012 | |

\* cited by examiner

*Primary Examiner* — Anthony D Barfield

(57) ABSTRACT

An adjustment device for motor vehicle seats has an adjusting section (1) and an inflation body (2) arranged in the adjusting section (1). The inflation body (2) is arranged such that causes a movement of the adjusting section (1) when filled with and/or drained of a fluid, particularly air. The adjusting section (1) has a fin ray-like structure with transverse webs (3a, 3b, 3c) that run between the fin ray sections (1a, 1b), connecting the same. The adjusting section (1) further has a counter bearing projection (4) arranged on only a first fin ray section (1a), wherein the inflation body (2) is arranged between the counter bearing projection (4) and a transverse web (3b).

6 Claims, 3 Drawing Sheets

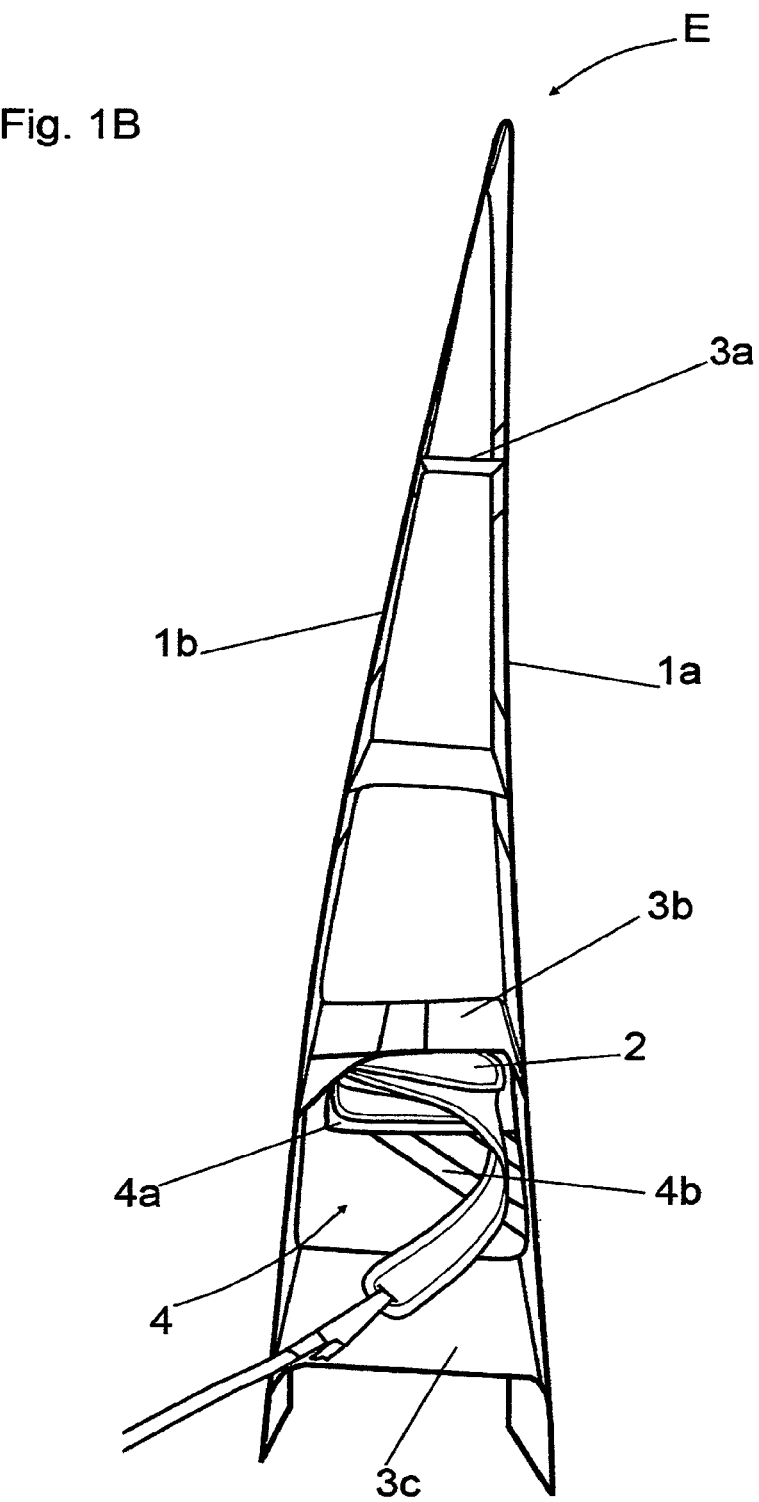

ADJUSTMENT DEVICE FOR MOTOR VEHICLE SEATS

TECHNICAL FIELD

The invention relates to an adjustment device for motor vehicle seats and more particularly, to An adjustment device for motor vehicle seats that has an adjusting section and an inflation body arranged in the adjusting section wherein the inflation body is arranged such that it causes a movement of the adjusting section when filled with and/or drained of a fluid, particularly air.

BACKGROUND INFORMATION

Respective adjustment devices for motor vehicle seats are known, for example from DE 10 2008 028 353 or DE 10 2008 063 150, and are employed, for example to adjust the contour of side bolsters, in order to implement a side support for the vehicle occupant. The adjustment principle is based on the fact that an inflatable body is provided between two plates and when filled with a fluid, such as air, presses the two plates apart. This arrangement is covered with a seat cushion. The contour changes its shape when the inflatable body is filled according to how movable the plates are designed.

This type of adjustment is generally sufficient for a comfort adjustment of the seat because as a rule the seat contour is adapted to the occupant only once. However, usually this type of adjustment is relatively slow because a relatively large volume of the inflatable body must be filled or emptied through a relatively small hose line. With the system described, frequent or fast adjustments that offer additional support, for example in case of accidents, are not possible or are possible only to a limited degree. Very high pressure would be required to fill a volume quickly in order to fill a large volume in a short time thus achieving large adjustment paths or a significant contour change.

Known from DE 10 2007 054 257 A1 is a vehicle seat with a curved elastic section having advancement sections with an adjustment element arranged between their free ends. The curvature of the bent section is changed by applying pressure on the two free ends.

SUMMARY OF THE INVENTION

The problem addressed by the current invention is to provide an adjustment device of the aforementioned kind that can be adjusted quickly and is also suited as a safety device.

The invention provides for the adjustment device to have an adjustment component having a fin-ray structure with the at least one inflatable body arranged therein. A fin-ray structure has a plurality of cross-webs connecting the fin-rays or fin-ray sections. The fin-rays are merged in an end section. The inflatable body is supported by a counter support protrusion that protrudes from a first fin-ray and extends essentially in the direction of the respective other fin-ray. The inflatable body is then arranged between this counter support protrusion and one of the cross-webs. When filling the inflatable body with a fluid such as air, the cross-web and the counter support protrusion are pressed apart.

Through the connection with the fin-rays, the fin-rays are re-shaped or curved, resulting in a strong re-positioning of the end sections of the fin-rays and thus in a strong re-shaping and re-positioning of the adjustment device or the adjustment component, respectively.

The invention also concerns a vehicle seat with at least one adjustment device according to the invention. Through the strong reshaping and re-positioning of the adjustment device, and primarily by this being caused by a small stroke of the inflatable body, not only the comfort adjustments can be affected quickly in vehicle seats. It is also possible to utilize the quickly executed adjustment of seat regions for support and occupant protection in the event of a crash, for example by a side bolster being re-positioned to provide lateral support for the occupant in case of a collision.

BRIEF DESCRIPTION OF THE DRAWINGS

These and other features and advantages of the present invention will be better understood by reading the following detailed description, taken together with the drawings wherein:

FIG. 1B is a perspective view of an adjustment device according to the invention in a first position;

PREFERRED EMBODIMENT

Figure 1A:
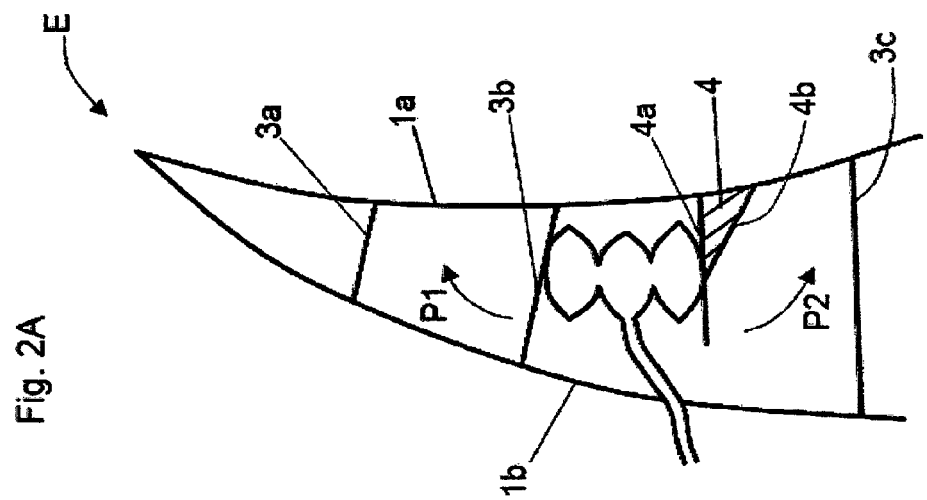
FIG. 1A schematically shows an adjustment device according to the invention in a first position.
Figure 2A:
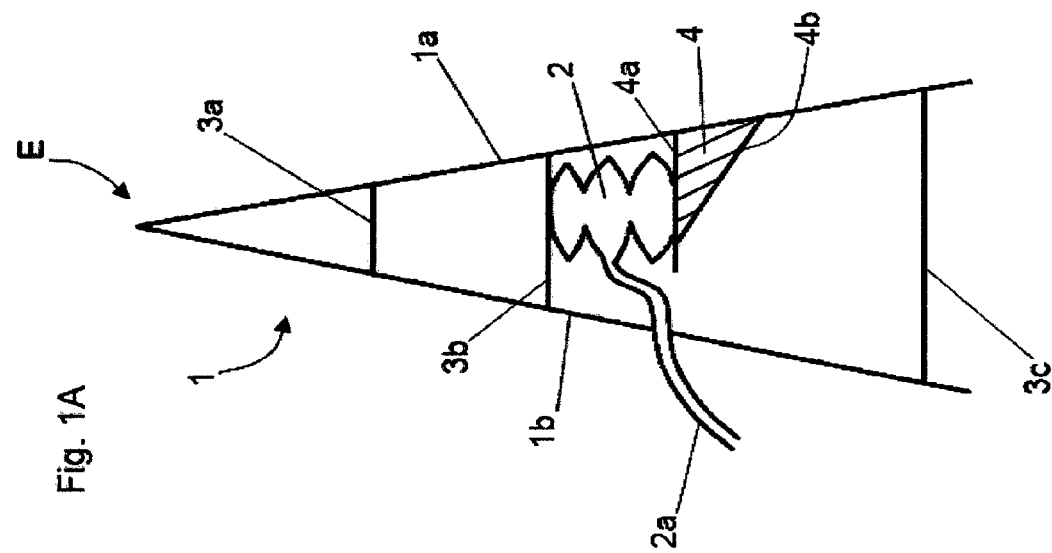
FIG. 2A schematically shows the adjustment device according to the invention in a second position.
Figure 2B:
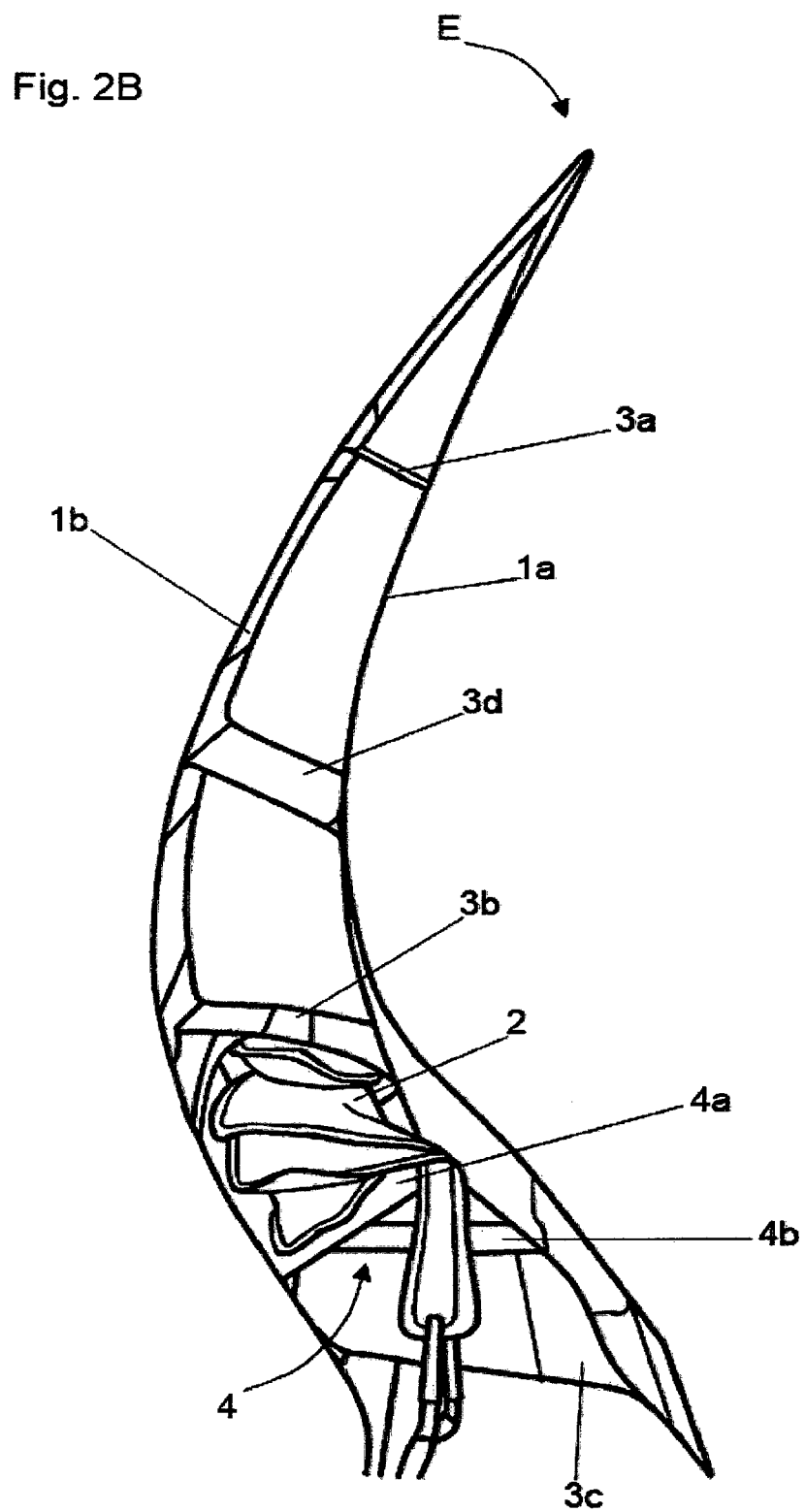
FIG. 2B is a perspective view of the adjustment device according to the invention in a second position.

FIGS. 1A and 1B show the same adjustment condition of the adjustment device; the same applies to FIGS. 2A and 2B.

The adjustment device according to the invention has an adjustment component 1, which is shown in FIGS. 1A, 1B in a non-adjusted condition. It is provided at any adjustable component of the seat, in particular the side bolsters of the seat, and has a fin-ray structure with two fin-rays 1a, 1b that are merged in an end section E and are connected to each other via a plurality of cross-webs 3a, 3b, 3c. The cross-webs 3a, 3b, 3c extend preferably perpendicular to the adjustment component's 1 plane of symmetry.

The inflatable body 2 is arranged between one of the cross-webs 3b and a counter support protrusion 4. The inflatable body 2 can be filled with a fluid, in particular air, or evacuated via a supply line 2a. The counter support protrusion 4 has an upper side 4a that reaches from one of the fin-rays 1a into the interior of the adjustment component 1 with the inflatable body 2 resting or supporting itself on said upper side 4a. The fin-rays 1a, 1b are designed elastically such that they can build a restoring force during re-positioning, with said restoring force allowing them to return to the original position shown in FIGS. 1A and 1B. In the shown example, the counter support protrusion 4 is connected in at least two sections that are at a distance to the fin-ray in the longitudinal direction to said fin-ray, once in the section of the upper side 4a and once in the section of a diagonal strut 4b connecting the upper side 4a to the fin-ray 1a and in the shown example connected to the fin-ray 1a underneath or at a distance from the upper side. It is important that the counter support protrusion 4 is connected to only one fin-ray.

When the inflatable body 2 is filled, it presses on one hand against the cross-web 3b and on the other hand against the counter support protrusion 4. As shown in FIGS. 2A, 2B this leads to the counter support protrusion 4 being displaced downward in the direction of the arrow P2. The fin-ray 1a is thereby curved due to the connection of the fin-ray 1a and the counter support protrusion 4. Because of the cross-webs 3a, 3b, 3c, the fin-ray 1b is curved as well and the end section E of the structure is re-positioned. The cross-web 3b is thereby forcibly displaced in the direction of arrow P1. When the inflatable body 2 is evacuated again, the restoring forces in the adjustment component 1 ensure that the condition shown in FIGS. 1A, 1B is restored.

One notices that already a small fill volume of the inflatable body 2 leads to a large change in the shape, a strong deflection of the fin-rays 1a, 1b and strong re-positioning of the end section E of adjustment component 1. Consequently, the time for achieving this effect is very short such that this device is particularly suited for a fast, instantaneous adjustment in the event of a crash.

Modifications and substitutions by one of ordinary skill in the art are considered to be within the scope of the present invention, which is not to be limited except by the allowed claims and their legal equivalents.

The invention claimed is:

1. An adjustment device for vehicle seats having an adjustment component (1) and an inflatable body (2) arranged in the adjustment component (1), wherein the inflatable body (2) is arranged such that it affects a movement when being filled with a fluid or/and when being emptied of the fluid, characterized in that the adjustable component (1) has a fin-ray structure with a plurality of cross-webs (3a, 3b, 3c) that extend between fin-ray sections (1a, 1b) and connect the fin-ray sections, wherein the adjustable component (1) also has one counter support protrusion (4) that is attached to only one fin-ray section (1a), wherein the inflatable body (2) is arranged between the counter support protrusion (4) and one cross-web (3b).

2. The adjustment device of claim 1, characterized in that a distance between the counter support protrusion (4) and the cross-web (3b) is dimensioned such that when filled, the inflatable body (2) presses the counter support protrusion (4) and a cross-web (3b) apart.

3. The adjustment device as in claim 1, characterized in that the counter support protrusion (4) is connected to the first fin-ray section (1a) in at least two sections at a distance from each other in the direction of a longitudinal extension (X) of the first fin-ray section (1a).

4. The adjustment device of claim 1, wherein said adjustment device is disposed in a vehicle seat.

5. The adjustment device of claim 4, characterized in that the adjustment device is configured to adjust a side bolster region of the vehicle seat.

6. The adjustment device of claim 1, characterized in that the fluid is air.

* * * * *